April 5, 1949.   O. B. WESTMAN ET AL   2,466,190
TRIM PANEL ASSEMBLY
Filed Feb. 23, 1946
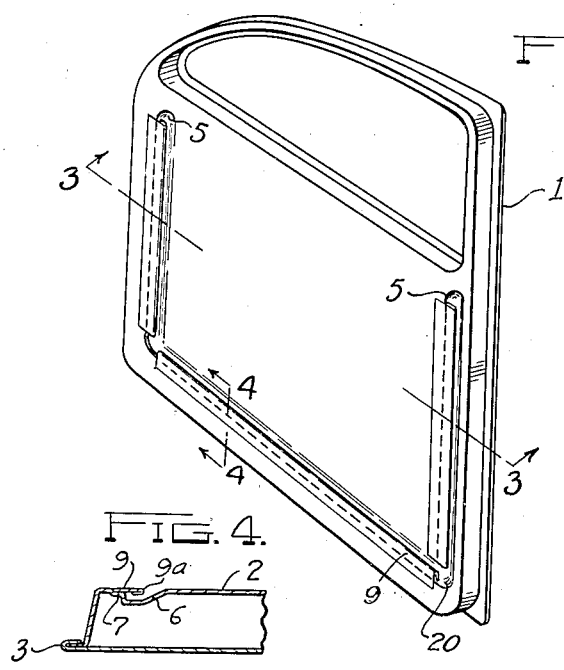
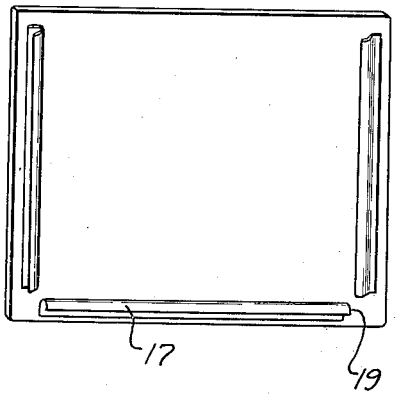
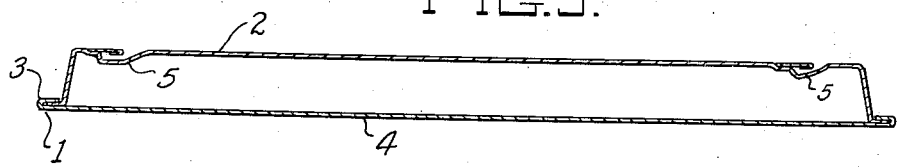
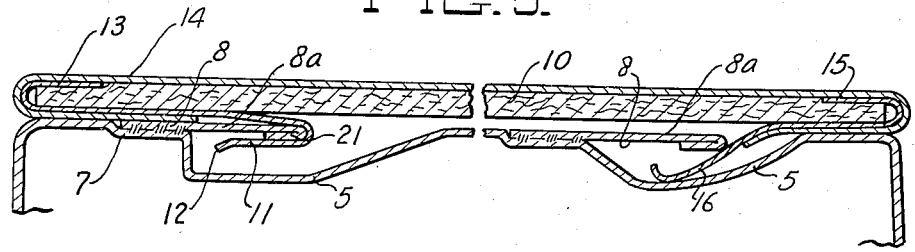
INVENTOR.
Oscar B. Westman
BY Oscar W. Olson
Barnes, Kisselle, Laughlin & Raisch
ATTORNEYS Patented Apr. 5, 1949

2,466,190

UNITED STATES PATENT OFFICE 2,466,190

TRIM PANEL ASSEMBLY

Oscar B. Westman and Oscar W. Olson, Detroit, Mich., assignors to General Motors Corporation, Detroit, Mich., a corporation of Delaware Application February 23, 1946, Serial No. 649,514

5 Claims. (Cl. 296—44)

This invention relates to trim panel assemblies.

Various methods of assembling the trim panels on the metal inside panels of doors, such as automobile doors, have been proposed. These panels used to be tacked on in the early bodies of the composite type. With the advent of all-metal doors various assemblies were proposed and some of them used involving snap fasteners and others involving pins attached to the back of the trim panel that could be forced through perforations in the door panel and allowed to spread to hold the trim panel to the door panel. It has also been heretofore proposed to have fasteners on the inside of the trim panel that could be hooked into perforations in the door (Meader No. 1,903,469) and it has even been proposed to have the edges of the inside panel overhanging a rabbet in the margin of the door so that a trim panel with turned-over metal edges can be slid up over the door panel by the overturned edges engaging the overhanging edges of the inner door panel (Woodall No. 1,764,668). It has also been proposed to depress a groove around the margin of the inside panel of the door and strike out tabs. Hook strips are provided on the back of the trim panel along the side and bottom margins. The side hook strips are arranged to be hooked in the struck-out tabs of the grooves by first placing the hook strip at one side in engagement with the tabs, then bending or warping the trim panel to temporarily shorten its width to allow the other side hook strip to be engaged with the tabs on the other side of the door. Then the panel is slid down to enable the bottom hook strips to engage under the tabs in the bottom strip (Miller-Trautvetter No. 1,960,949).

The present trim panel assembly is believed to be an improvement over the known art in enabling the inner panel of the door to be kept entirely free from perforations. Perforations are undesirable because the door well in a heavy rainstorm or during washing of the car may partially fill with water, and the water may drain through the openings and stain the upholstery. The improved trim panel may be applied to the door panel without first engaging the top of the trim panel in the slide guides at the very bottom of the door and then sliding the trim panel up into its final position of full registry with the inner panel. This is not feasible in the present-day low-hung bodies when the door has already been hung on the body. Such an assembly would have to be made before the door is hung on the body. And in such an assembly there is nothing but friction to keep the panel from gradually working down.

In our improved trim assembly these objectionable features are eschewed as will be more apparent after a description of the improved assembly.

In the drawings:

Fig. 1 is a perspective of the inside of an automobile door.

Fig. 2 is an elevation of the back of the trim panel.

Figs. 3 and 4 are sections on the corresponding section lines of Fig. 1.

Fig. 5 is a cross section showing the trim panel assembled on the inside door panel.

The door is shown in Fig. 1. 1 is the usual overlap flange which is formed by the turned-out flange of the metal inner panel 2 and the folded-over flange 3 of the outside panel 4. The inside panel has three grooves along the margin of the panel—two side grooves 5 parallel with the side edges of the panel and one bottom groove 6 parallel with the bottom edge of the panel. These grooves are stamped in the inner panel as is also a seat or step 7 arranged to seat the side dovetail-forming strips 8 and the bottom dovetail-forming strip 9. These strips are spot or relief welded to the seat or step and they have overhanging flanges 8a and 9a overhanging the grooves 5 and 6.

Now referring to Fig. 5, it will be seen that the left-hand side of the trim panel 10 has a folded metal strip 11 with a flared-out bill 12. This forms an elongated spring hook, that is, the folded portion is slightly expanded or distorted outwardly when the hook engages the overhanging flange 8a and this holds the trim panel firmly in place. The other side of the strip is folded as at 13 and is hooked over the edge of the trim panel before the upholstery cover 14 is applied. Likewise, the elongated hooked strip on the right-hand side of the panel has a side edge 15 which hooks over the edge of the strip before the upholstery or trim material 14 is applied. This strip does not have a folded hook-like portion as the strip on the opposite side, but it has an outwardly flared or curved elongated wing 16 which is adapted, when the panel is slid from right to left, to slide in and crowd in under the overhanging flange 8a and thereby slightly distort, when crowded in under the flange. Hence, there is the spring clamping action of the elongated hook strip on one side of the panel and the outwardly-flared elongated wing on the other side of the panel.

The assembly is made by first sliding the lower hook strip 17 into the lower groove under the lower overhanging flange 9a. When the trim panel shown in Fig. 2 is first applied to the inside of the door, as shown in Fig. 1, the end 19 (see Fig. 2) enters the groove 18 at the point 20 in Fig. 1. Then the trim panel is slid to the left in Fig. 1, there being a dovetail engagement between the elongated hook strip 17 and the overhanging flange 9a of the bottom groove 6. Then as the elongated side hook strip reaches the groove in the inner panel the hook will engage the folded-over edge of the overhanging strip 8a, the flared-out bill 12 facilitating this engagement. This engagement will precede the engagement of the flared-out wing 16 at the other side of the trim panel. This flared-out wing will ride down into the groove, as shown in Fig. 5, and engage in and crowd under the flange 8a, as shown in Fig. 5, and the trim panel and the metal door panel will thus be clamped together and firmly held together by the distortion of the strips on the back of the trim panel. This will complete the assembly and it will be firmly held in place, but it will be obvious that by driving the trim panel to the right it may easily be disassembled from the door panel.

We claim:

1. In a trim panel assembly, the combination of a door provided with an inner panel having imperforate grooves or depressions paralleling the side and bottom margins, each groove provided with an overhanging flange, the said overhanging flanges of the side grooves extending outwardly in the same direction, and a trim panel having fastened to the back along the margins strip members arranged to be engaged in the grooves under said overhanging flanges by sliding the bottom strip lengthwise of the overhanging flange of the bottom groove and sliding the two side strips in one direction under the overhanging flanges of the two side grooves.

2. In a trim panel assembly, the combination of a door provided with an inner panel having imperforate grooves or depressions paralleling the side and bottom margins, each groove provided with an overhanging flange, the said overhanging flanges of the side grooves extending outwardly in the same direction, and a trim panel having fastened to the back along the margins strip members arranged to be engaged in the grooves under said overhanging flanges by sliding the bottom strip lengthwise of the overhanging flange of the bottom groove and sliding the two side strips in one direction under the overhanging flanges of the two side grooves, the said side strip members engaging the outer edges of said overhanging flanges and being distorted thereby to hold the trim panel firmly clamped to the inner door panel.

3. In a trim panel assembly, the combination of a door provided with an inner panel having imperforate grooves or depressions paralleling the side and bottom margins, each groove provided with an overhanging flange, the said overhanging flanges of the side grooves extending outwardly in the same direction, and a trim panel having fastened to the back along the margins strip members arranged to be engaged in the grooves under said overhanging flanges by sliding the bottom strip lengthwise of the overhanging flange of the bottom groove and sliding the two side strips in one direction under the overhanging flanges of the two side grooves, the said overhanging flanges being formed by metal dovetail-forming strips that are seated in a countersunk step along the said grooves and welded to the inner panel metal at this point.

4. In a trim panel assembly, the combination of a door provided with an inner panel having grooves or depressions paralleling the side and bottom margins, each groove provided with an overhanging flange, the flanges in the side grooves extending in the same direction and a trim panel having fastened to the back along the margins strip members arranged to be engaged in the grooves under said overhanging flanges, the strip member along one side margin of the trim panel and along the bottom margin being an elongated hook-like member adapted to engage around the overhanging flanges in the side and bottom grooves and the strip on the other side margin being a flared-out elongated wing adapted to be slid under the overhanging flange in the groove along the other side margin.

5. In a trim panel assembly, the combination of a door provided with an inner panel having grooves or depressions paralleling the side and bottom margins, each groove provided with an overhanging flange, the flanges in the side grooves extending in the same direction and a trim panel having fastened to the back along the margins strip members arranged to be engaged in the grooves under said overhanging flanges, the strip member along one side margin of the trim panel and along the bottom margin being a hook-like member adapted to engage around the overhanging flanges in the side and bottom grooves and the strip on the other side margin being a flared-out wing adapted to be slid under the overhanging flange in the groove along the other side margin, the hook-like strip at the bottom of the trim panel being engaged over the overhanging flange of the bottom groove of the door panel and the trim panel slid sideways whereupon the hook-like strip at the advance side of the sliding panel hooks into and engages under the overhanging flange of the groove at the further side of the door while the flared-out wing on the back of the trim panel on the other side of the trim panel slides into the groove along the other side edge and under the overhanging flange thereof.

OSCAR B. WESTMAN.
OSCAR W. OLSON.

REFERENCES CITED

The following references are of record in the file of this patent:

UNITED STATES PATENTS

| Number | Name | Date |
|---|---|---|
| 1,960,949 | Miller et al. | May 29, 1934 |

FOREIGN PATENTS

| Number | Country | Date |
|---|---|---|
| 825,139 | France | Nov. 27, 1937 |